(12) United States Patent
Bartley et al.

(10) Patent No.: US 6,842,038 B1
(45) Date of Patent: Jan. 11, 2005

(54) SELF OPTIMIZING OFF CHIP DRIVER

(75) Inventors: Gerald Keith Bartley, Rochester, MN (US); Richard Boyd Ericson, Rochester, MN (US); Philip Raymond Germann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/670,714

(22) Filed: Sep. 25, 2003

(51) Int. Cl.[7] .............................................. H03K 19/003
(52) U.S. Cl. .............................. 326/30; 326/57; 326/27
(58) Field of Search .............................. 326/56–58, 21, 326/26–27, 30–31, 33–34

(56) References Cited

U.S. PATENT DOCUMENTS 6,020,757 A * 2/2000 Jenkins, IV ................... 326/39
6,329,835 B1 * 12/2001 Chen ............................ 326/27
6,690,191 B2 * 2/2004 Wu et al. ..................... 326/30

* cited by examiner

Primary Examiner—James H. Cho
(74) Attorney, Agent, or Firm—Robert R. Williams

(57) ABSTRACT

The present invention provides apparatus and methods to eliminate a required "dead cycle" or "living cycle" during transfer of control from a first source terminated driver to a second source terminated driver on a bidirectional signaling conductor. On a last bus cycle on which the first driver drives the signaling conductor, the first driver stops driving and goes into a high impedance state respondent to detection that the first driver current has become lower than a predetermined current or that a voltage at the output of the first driver has become within a predetermined voltage difference of a target voltage. The second driver, knowing that the first driver will be switched to a high impedance state, can assume control of the signaling wire and drive a signal on the signaling conductor shortly after receipt of the signal from the first driver.

14 Claims, 7 Drawing Sheets

SELF OPTIMIZING OFF CHIP DRIVER

BACKGROUND OF THE INVENTION

1. Field of the Invention

The present invention generally relates to signaling between electronic units. More specifically, the present invention relates to signaling on bidirectional signaling busses.

2. Description of the Related Art

Electronic systems generally comprise multiple electronic units that are interconnected by signaling conductors. These signaling conductors typically are electrically conducting paths made of copper, aluminum, or other such material.

The signaling conductors used in high speed electronic systems are known as transmission lines, defined by a characteristic impedance and a propagation velocity. The transmission line has distributed electrical properties of resistance, inductance, conductance, and capacitance per unit length that are constant along the transmission line. Typically, in transmission lines, resistance and conductance per unit length is small, so that high speed signal behavior on the transmission line is chiefly determined by the inductance and capacitance per unit length. High speed signaling behavior is seen when voltage risetimes and falltimes of signals is less than the time it takes for the transition to propagate from a first end of the transmission line to a second end. Examples of transmission lines are coaxial cables, twisted pairs, and wires at a constant distance from a reference plane (e.g., ground). For example, many transmission lines are signaling conductors on printed wiring boards (PWBs) in computer systems. Such transmission lines are commonly designed to have approximately 50 ohms characteristic impedance, with propagation velocity of about 65 pS (picoseconds) per centimeter.

A number of methods are used to transmit signals on transmission lines. For example, some electronic systems place terminating resistors at each end of each transmission line. If a signal is propagating along a 50 ohm transmission line and reaches an end of the transmission line which is terminated by a 50 ohm resistor, no reflection occurs. Such a termination technique dissipates a large amount of power. Reflections result from mismatches in impedances. For example, if a one volt signal edge propagating along a 50 ohm transmission line encounters an open circuit (i.e., very high impedance, typical of an unterminated receiver), a one volt reflection propagates backward along the transmission line, causing voltage on the transmission line following the reflection to be two volts. If the one volt signal should encounter a short circuit, a minus one volt reflection propagates backward along the transmission line.

A widely used alternative technique for driving signals on transmission lines is called source termination. Source termination uses a driver that has the same impedance as the transmission line. For example, such a driver could be thought of as a 50 ohm resistor coupled to the exemplary 50 ohm transmission line, the other end of the resistor being coupled to a supply voltage to drive a logical "1", or to a ground voltage to drive a logical "0". FIG. 1 shows an electronic system 100, comprising a first electronic unit 101, a second electronic unit 111, and a transmission line 120. First electronic unit 101 further comprises a driver 105 having inputs D and E for data and enable, respectively. Driver 105 is coupled to a first end 121 of transmission line 120. First electronic unit 101 further comprises a receiver 106 that receives a signal from the first end of transmission line 120 and drives a signal 104. Similarly, second electronic unit 111 comprises a driver 115 and a receiver 116. First and second electronic units 101 and 111 time multiplex their use of transmission line 120; that is, they take turns driving and receiving signals over transmission line 120. Various protocols are known to assign ownership for driving (i.e., electronic unit 101 or electronic unit 111) of the signaling conductor at any point in time.

FIG. 2 shows a conventional source terminated driver 200 as an embodiment of drivers 105 and 115. If transmission line 120 is a 50 ohm transmission line, driver 200 should have an impedance of 50 ohms when driving either a logical "1" or a logical "0" in order to match the transmission line. Note that some tolerance is allowable in the matching of a source terminated driver and the transmission line and signals can still be transmitted reliably. Actual degree of mismatch is dependent on noise and other factors. Typically, if the impedance of the source terminated driver is within 20% of the characteristic impedance of the transmission line, signaling on the transmission line will be acceptable. For exemplary purposes here, a perfect match is assumed for simplicity. Driver 200 is designed such that the impedance of p-channel field effect transistor (PFET) QP1 (when QP1 is conducting) plus the value of resistor R1 is 50 ohms. Similarly, the impedance of n-channel field effect transistor QN1 (when QN1 is conducting) plus the value of resistor R1 is 50 ohms. When the signal coupled to input "E" is "1" and the signal coupled to input "D" is "1", QP1 conducts and QN1 is turned off. Output "OUT" is driven high with an impedance of 50 ohms. When "E" is at "1" and "D" is at "0", QP1 is turned off, and QN1 conducts, driving output "OUT" low with an impedance of 50 ohms. When input "E" is "0", both QP1 and QN1 are turned off and the impedance of driver 200 seen at "OUT" is very high, that is, the impedance is at least an order of magnitude higher than the characteristic impedance of the transmission line, and, typically, is over a megohm. NAND 201 has an output that drives the gate of QP1 active (i.e., a low voltage to turn on QP1) if both the signal coupled to input "D" and the input coupled to "E" are "1". NOR 202 has an output that drives the gate of QN1 active (i.e., a high voltage to turn on QN1) if the signal coupled to input "D" is "0" and the signal coupled to input "E" is "1".

FIG. 3 shows voltage waveforms as seen at nodes 121 and 122 as driver 105 (see FIG. 1) drives a "1". The length of transmission line 120 has a total propagation delay of "Tprop"; that is, a signal takes "Tprop" time to propagate from node 121 to node 122. For example, if transmission line 120 has a propagation velocity of 65 pS per centimeter, and is 100 centimeters long, Tprop would be 6500 pS. VNE is the voltage at the "near end", that is, near or at the driver, in the present example, at node 121. Since transmission line 120 in the example has a characteristic impedance of 50 ohms and driver 105 has an impedance of 50 ohms, a signal having half the voltage applied to a source of QP1 propagates down transmission line 120. After one "Tprop" time, the signal reaches node 122, the "far end" of transmission line 120. Driver 115 is disabled (i.e., a signal at node 113 is "0") at this time, so driver 115 has a very high impedance. Receivers 106 and 116 also are designed to have very high impedance. As discussed earlier, as the signal encounters a very high impedance, a doubling of the voltage occurs and propagates backwards along transmission line 120. For discussion, Vdd is the voltage applied to the source of QP1. VFE, the voltage at note 122 becomes equal to Vdd as the signal reaches node 122. In practice, finite voltage risetimes and a need to charge parasitic capacitance associated with physical elements (e.g., module pins and other connectors) cause VFE to not double "instantly". In addition, tolerances in driver 105 and transmission line 120 may cause the "doubled" voltage at node 122 to be slightly higher or slightly lower than Vdd. Still referring to FIG. 3, when the reflection returns to driver 105 after two "Tprop" times, the voltage at node 121 becomes Vdd. As before, tolerances may make the voltage at node 121 slightly different than Vdd (in the case of a rising signal); however in a properly designed electronic system such differences are small. Until the reflection returns, driver 105 drives a current equal to Vdd/(100 ohms). (Impedance of (QP1+R1)=50 ohms, and the characteristic impedance of transmission line 120 is 50 ohms.) When the reflection returns, voltage at node 121 rises to Vdd, causing current in driver 105 to stop flowing. A similar process occurs when driver 105 drives a "0".

FIG. 3 shows "Tbit", the shortest time needed before driver 115 could electrically drive a signal after driver 105 has driven a signal. Note that Tbit is shown to include a small time following when VFE (i.e., voltage at node 122) has reached "1" (i.e., Vdd). This small time is the time needed for receiver 116 to propagate the signal via signal conductor 114 into a latch and for other circuitry to enable driver 115 via a signal on signal conductor 113. In modern high speed systems, this time is small compared to typical Tprop times. In subsequent discussion, for simplicity, this time is assumed negligible.

A problem exists, however, in enabling driver 115 to drive a signal immediately upon receipt of the signal from driver 105. Driver 105 must be disabled before the signal driven by driver 115 arrives at node 121 (FIG. 1), but after the reflection of the signal driven by driver 105 has returned to node 121. A system designer must know how long Tprop is for all such transmission lines, and must also know where clock edges are in his or her timing diagrams. Two approaches have been used to provide for resolution of the problem. A first approach, seen in FIG. 4A, uses a "dead cycle". A dead cycle is a bus cycle (a "Tbit" time) in which a signaling conductor, (i.e., a transmission line) is not driven by any driver coupled to the signaling conductor. That is, all drivers coupled to the signaling conductor are switched to a high impedance state ("high impedance" meaning at least an order of magnitude higher impedance than the characteristic impedance of the transmission line). "A drives" represents the time when driver 105 of FIG. 1 is enabled; "B drives" represents the time when driver 115 is enabled. EN-A, which is the signal at the "E" input of driver 105, rises at 407 to enable driver 105. At 408, EN-A falls, disabling driver 105. During "Tbit 1", driver 105 drives a "1", with rise 401 going from zero volts to Vdd/2 as described earlier. After one Tprop time, rise 402 occurs at node 122, and at the end of the "Tbit 1" time, driver 105 is disabled (i.e., switched to a high impedance state). Driver 105 had been sourcing a current equal to Vdd/(100 ohms); disabling causes Driver 105 to quickly stop sourcing current, causing the voltage at node 121 to fall at point 403. Voltage at points on transmission line 120 will, in practice, rise and fall according to standard behavior of a transmission line having a very high impedance at both ends. Points 404 and 405 simply indicate that the voltage at node 121 can become a complex waveform dependent on small capacitance parasitic or other parasitic factors. The signal waveform is not drawn following point 405 because the waveform quickly becomes hard to predict, in general. Similarly the reflection of the fall at point 403 is seen at node 122 after a Tprop delay. EN-B represents the signal on node 113 of FIG. 1, that is, at input "E" of driver 115. EN-B rises at 409, at the beginning of "Tbit 3" time. Using a dead cycle ensures that driver 105 is not enabled when a signal driven by driver 115 arrives, but "Tbit 2" is totally wasted, having no data transmitted by either driver 105 or driver 115.

Another solution to the problem described is to use a "live cycle", as shown in FIG. 4B. A live cycle is a bus cycle (a "Tbit" time) when the last driver to drive a signal during a "Tbit" time continues to drive the same logic level. Again, the time during "Tbit 2" is wasted. During the live cycle scheme, driver 105 is kept enabled during "Tbit 2", and the "D" input of driver 105 is kept the same as was applied during "Tbit 1". EN-A rises at 427, the start of "Tbit 1" and does not fall until 428, the end of Tbit 2. EN-B rises at 429, the start of Tbit 3. Voltage at node 121 rises to Vdd/2 at 421. Voltage at node 122 rises to Vdd at 422 after a Tprop delay. The reflected signal returns to node 121 at 423, causing current in driver 105 to stop flowing, as discussed earlier. When EN-A disables driver 105 at 428, no "glitch", as was seen at 403 in FIG. 4A, occurs, since no current was flowing in driver 105 at 428. EN-B rising at 428 enables driver 115, causing voltage at node 122 to fall from Vdd to Vdd/2 at 424. Driver 115's signal arrives at node 121 at 425, and driver 115's signal reflection returns to driver 115 at 426. As with the dead cycle scheme, "Tbit 2" is used only to ensure that neither driver 105 nor 115 is conducting when the other's signal arrives.

Driver 105 or driver 115 (if properly designed to always match the impedance of transmission line 120) can drive a series of signals, during which the other driver is disabled, because reflections are suppressed by the proper termination at the source (i.e., the driver).

Therefore, a need exists to provide method and apparatus that allow a first driver at a first end of a transmission line to drive a signal during a first time period, followed by a second driver at a second end of a transmission line to drive a signal during a second time period, without a dead cycle or a live cycle between the first time period and the second time period.

SUMMARY OF THE INVENTION

The present invention generally provides methods and apparatus that allow a first source terminated driver coupled to a first end of a bidirectional signaling conductor to drive a first signal on the signaling conductor and be switched to a high impedance state after a reflection of the first signal returns to the first driver, if the first driver has relinquished control of the signaling conductor. A second driver coupled to a second end of the signaling conductor drives a second signal on the signaling conductor shortly after receipt of the first signal at the second driver.

In an embodiment, the first driver drives the first signal, while a sensor monitors a voltage at or near the output of the first driver. When the voltage reaches a predetermined voltage, and a logical enable signal is no longer active, the driver is placed in a high impedance state.

In an embodiment, the first driver drives the first signal, while a sensor monitors a current sourced or sunk by the first driver into the first end of the transmission line. When the current falls beneath a predetermined current, and a logical enable signal input to the first driver is no longer active, the driver is placed in a high impedance state.

In an embodiment, a first electronic unit and a second electronic unit are coupled by a bidirectional signaling bus comprising a plurality of signaling conductors, a first strobe signal and a second strobe signal. The first electronic unit and the second electronic unit time multiplex the signaling bus, each driving data to the other at time periods according to an agreed protocol. The first electronic unit drives a transition on the first strobe signal at substantially the same time that the first electronic unit drives data on the signaling bus. The second electronic unit drives a transition on the second strobe signal at substantially the same time that the second electronic unit drives data on the signaling bus. During transfer of signaling bus control from the first electronic unit to the second electronic unit, the second electronic unit uses the transition received on the first strobe signal to latch data sent from the first electronic unit via the signaling bus, and also uses the transition received on the first strobe signal to transmit a transition on the second strobe signal and at substantially the same time, transmit data on the signaling bus.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Having reference now to the figures, and having provided above a discussion of the art, the present invention will be described in detail.

The present invention provides apparatus and methods to eliminate a required "dead cycle" or "live cycle" during transfer of control from a first source terminated driver coupled to a first end of a transmission line to a second source terminated driver coupled to a second end of the transmission line. At the end of a bit time on which the first driver has control of the transmission line, and then relinquishes control of the transmission line, the first driver stops driving and goes into a high impedance state respondent to a sensor detecting that the first driver current has become lower than a predetermined current or that a voltage at the output of the first driver has risen to or fallen to a predetermined voltage indicative of receipt of a reflection of a signal sent by the first driver. The second driver, knowing that the first driver will be timely placed in a high impedance state, can assume control of the transmission line and drive a signal at the end of the bit time during which the first driver controlled the signaling conductor and subsequently relinquished control.

Figure 5A:
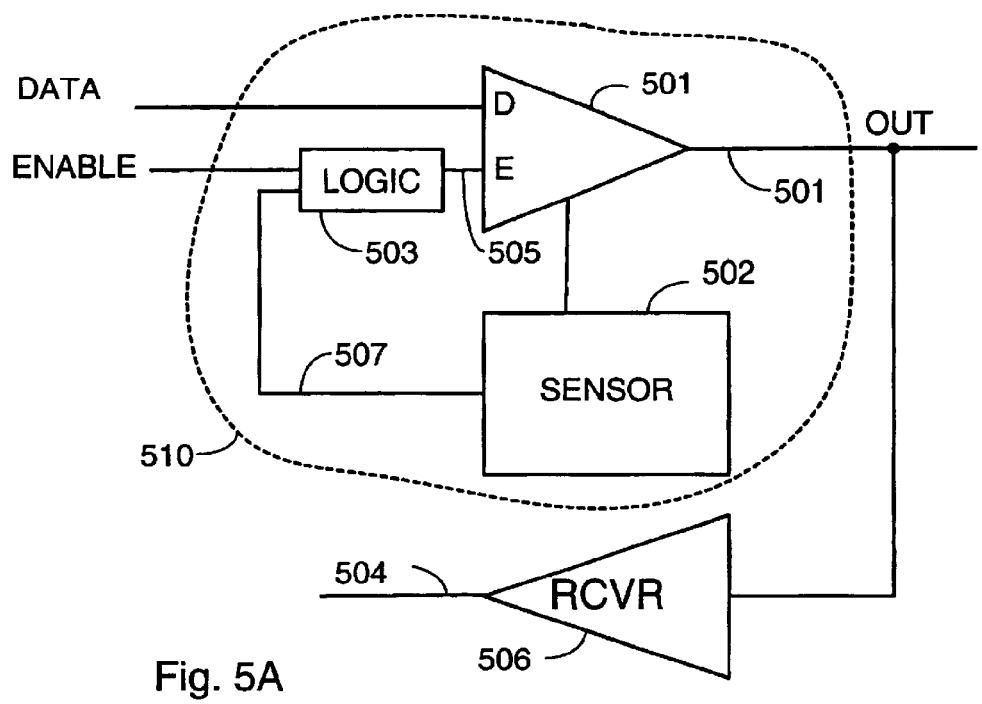
FIG. 5A–5B show a block diagram of a bidirectional driver/receiver according to a preferred embodiment of the present invention.

Referring now to FIG. 5A, a block diagram of an exemplary bidirectional driver/receiver is shown according to the present invention. A driver block 510 comprises a driver 501, a sensor 502 and an enable logic 503. Driver block 510 has a data input receiving DATA, an enable input receiving ENABLE, and a driver block output coupled to OUT. Driver 501 is a source terminated driver, advantageously a CMOS source terminated driver. Driver 501 is coupled to the data input of driver block 510, enable logic 503, and the output of driver block 510. Sensor 502, in an embodiment, senses a voltage at the output OUT of driver block 510 and produces one or more voltage compare signals coupled via a disable signal 507 to logic 503. Enable logic 503 asserts a driver enable signal 505 at input "E" of driver 501 if ENABLE is active. If ENABLE has become inactive, enable logic 503 maintains an enabling driver enable signal 505 at input "E" until sensor 502 detects that the output voltage at OUT has reached a predetermined voltage. When sensor 502 detects that the output at OUT has reached a predetermined voltage, the detection is reported to enable logic 503 via node 507. Enable logic 503, in response, then changes driver enable signal 505 at input "E" of driver 501 to disable driver 501, placing it in a high impedance state. However, if ENABLE is still asserted, driver enable signal 505 remains also asserted. Receiver 506 is a receiver capable of receiving signals received at node OUT of driver block 510.

In another embodiment, Sensor 502 senses a current sourced or sunk by driver 501 into the first end of transmission line 520. In, this embodiment, enable logic 503 again maintains an enabling driver enable signal 505 to input "E" until sensor 502 reports via a disable signal on node 507 that the current sourced or sunk by driver 501 into the first end of transmission line 520 has decreased to a predetermined current. When sensor 502 detects that the current has reduced to a predetermined current, the detection is communicated to enable logic 503. Enable logic 503, in response, changes the driver enable signal 505 at input "E" of driver 501 to disable driver 501, placing it in a high impedance state. If, however, ENABLE remains asserted, driver enable signal 505 also remains asserted.

Figure 5B:
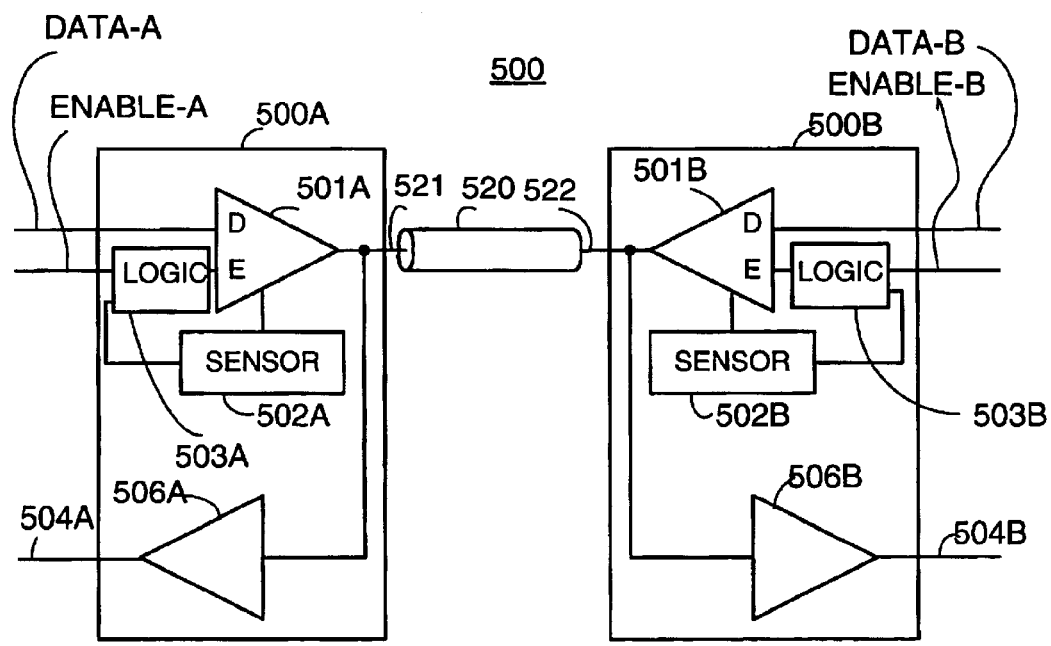

FIG. 5B shows an electronic system, generally designated as 500, having a first electronic unit 500A coupled to a second electronic unit 500B by transmission line 520. Electronic units 500A and 500B each comprise an instance of the bidirectional driver/receiver depicted in FIG. 5A. Signals DATA-A and DATA-B are data signals and may originate within electronic units 500A and 500B, respectively, or may be driven onto electronic units 500A and 500B from another electronic unit (not shown). Signals ENABLE-A and ENABLE-B are enable signals and may originate within electronic units 500A and 500B, respectively, or may be driven onto electronic units 500A and 500B from another electronic unit (not shown). DATA-A and DATA-B are instances of DATA in the driver depicted in FIG. 5A; ENABLE-A and ENABLE-B are instances of ENABLE in the driver depicted in FIG. 5A. Signals 504A and 504B are outputs driven by the receiver portions of bidirectional driver/receivers of electronic units 500A and 500B, respectively, and may be couple to other circuitry within electronic units 500A and 500B or may be driven to other electronic units (not shown). Drivers 501A and 501B are instances of driver 501; sensors 502A and 502B are instances of sensor 502; enable logic 503A and 503B are instances of enable logic 503.

Figure 6A:
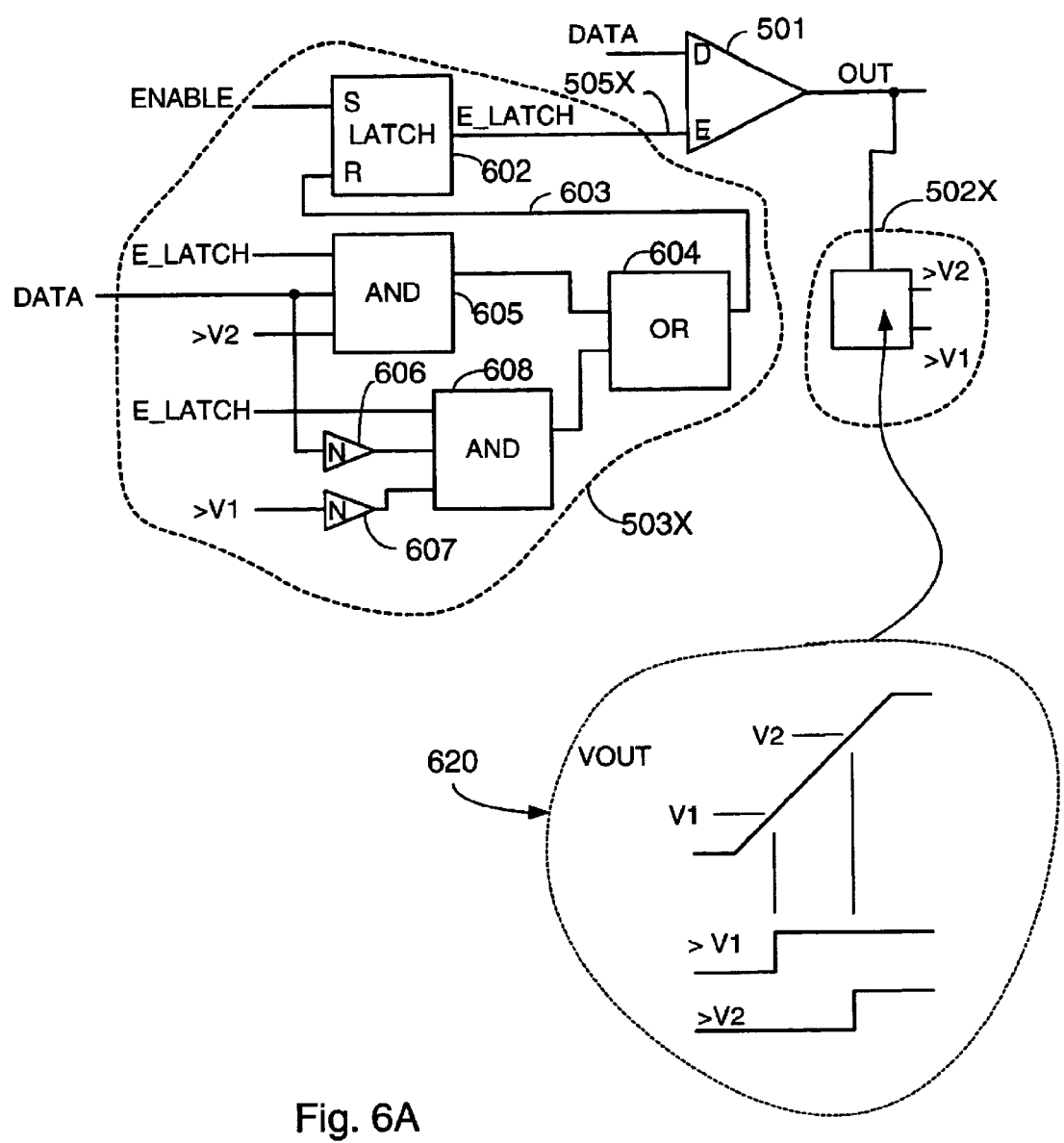
FIG. 6A–6B show a detailed logic block diagram of a driver and associated logic according to a preferred embodiment of the present invention.

FIG. 6A shows, in more detail, an embodiment of driver 501, sensor 502, and logic 503. Sensor 502x is a voltage comparison sensor embodiment of sensor 502. Response 620 shows that for voltages at OUT less than V1 volts, output signal ">V1" is a logical "0". If the voltage at OUT is greater than V1 volts, signal ">V1" is a logical "1". Similarly, if the voltage at OUT is less than V2 volts, signal ">V2" is a logical "0". If the voltage at OUT is greater than V2 volts, signal ">V2" is a logical "1". V1 and V2 are predetermined voltages. In an exemplary CMOS system, V1 is relatively near GND (ground), and V2 is relatively near Vdd (positive supply voltage). The difference between V1 and GND, or V2 and Vdd, must be determined in a particular system by the voltage difference between Vdd and ground, and the amount of electrical noise the electrical system is specified to tolerate, as well as the tolerances in the characteristic impedance of transmission line 520 and the impedances of drivers 501A and 501B when they are driving. For a typical electronic system, V1 will be approximately 20% of Vdd, and V2 will be approximately 80% of Vdd. The voltage-logic response of response 620 can be created in various embodiments. For example, in an embodiment (not shown), the V1 to ">V1" response is produced by a first CMOS inverter having a very strong n-channel field effect transistor (NFET) and a very weak p-channel field effect transistor (PFET), creating a low voltage switchpoint for the first CMOS inverter. Similarly, the V2 to ">V2" is produced by a second CMOS inverter having a very weak NFET and a very strong PFET, creating a high voltage switchpoint for the second CMOS inverter. In another embodiment (not shown), V1 and V2 are established by voltage dividers between Vdd and GND. A first differential amplifier has inputs coupled to OUT and V1, producing, at an output, signal ">V1". A second differential amplifier has inputs coupled to OUT and V2, producing, at an output, signal ">V2". Other circuits that produce signals ">V1" and ">V2" from a voltage VOUT as depicted in response 620 are contemplated by the present invention.

Enable Logic 503x is an embodiment of enable logic 503 that cooperates with sensor 502x. Latch 602 is a set-dominant latch. That is, if ENABLE is asserted (has a logic "1" value) at input "S", E_LATCH is asserted, and, via node 505x, drives the assertion to the "E" input of driver 501. If ENABLE goes to logic "0", latch 602 will hold E_LATCH at "1", until latch 602 receives a "1" at "R", the reset input on latch 602. Signal 603 is asserted (by AND 605 and OR 604) if E_LATCH is "1", DATA is "1" and ">V2" is "1". That is, the driver is enabled, the driver is driving towards a "1" output, and the voltage at OUT is "near" Vdd (i.e., is above V2). Signal 603 is also asserted (by AND 608, OR 604, and inverters 606 and 607) if E_LATCH is "1", DATA is "0", and ">V1" is "0". That is, the driver is enabled, the driver is driving towards a "0" output, and the voltage at OUT is "near" GND (i.e., is not above V1). However, if ENABLE remains asserted, E_LATCH also remains asserted, since latch 602 is a set-dominant latch.

Figure 1:
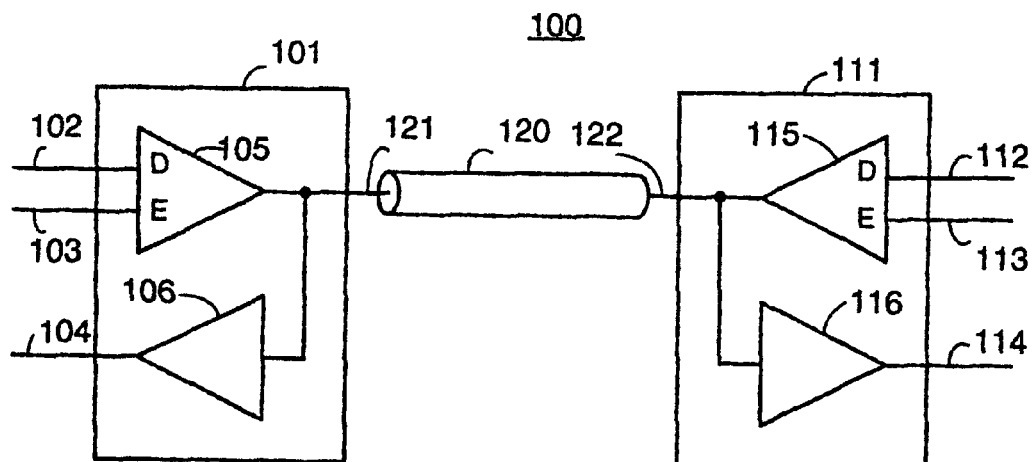
FIG. 1 shows a high level block diagram with two electronic units coupled by a signaling conductor.
Figure 2:
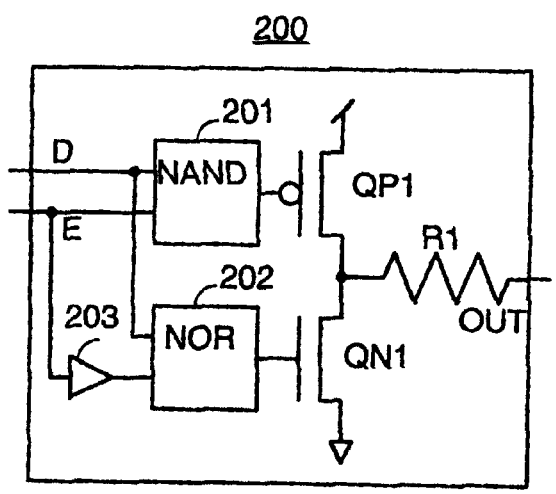
FIG. 2 shows a schematic of a conventional source terminated driver in a complementary metal oxide semiconductor (CMOS) technology.
Figure 3:
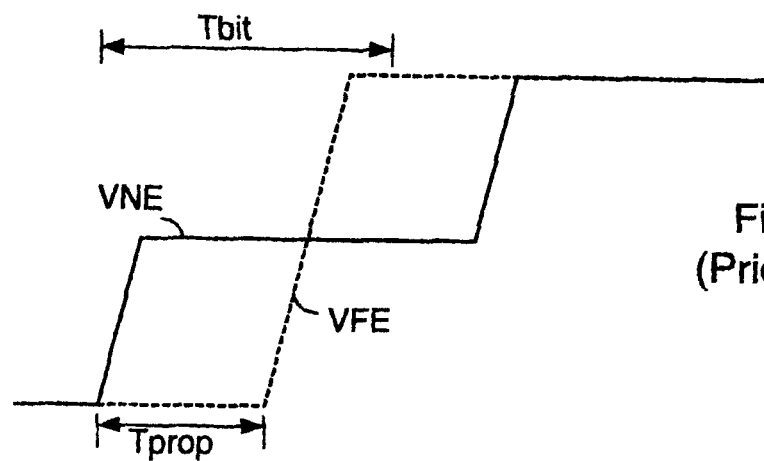
FIG. 3 is a voltage waveform showing voltage at a driver end of a transmission line and at a far end of the transmission line when driven by a source terminated driver.
Figure 4A:
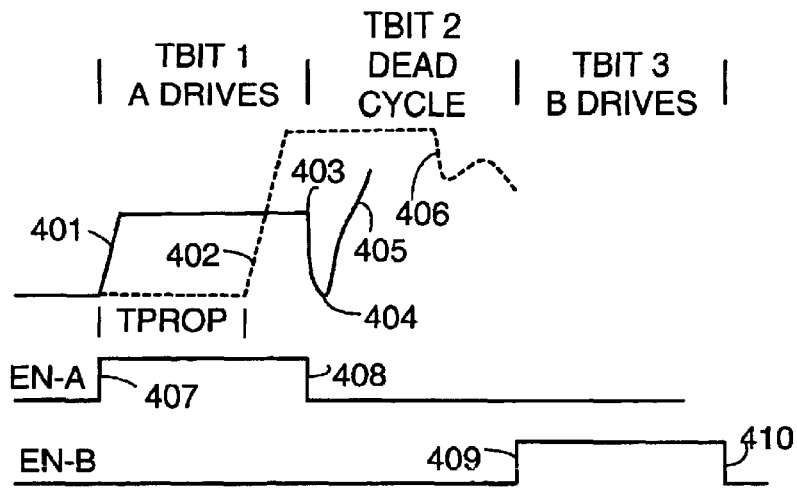
FIG. 4A is a voltage waveform showing voltage at a driver end of a transmission line and at a far end of the transmission line using a conventional dead cycle protocol.
Figure 4B:
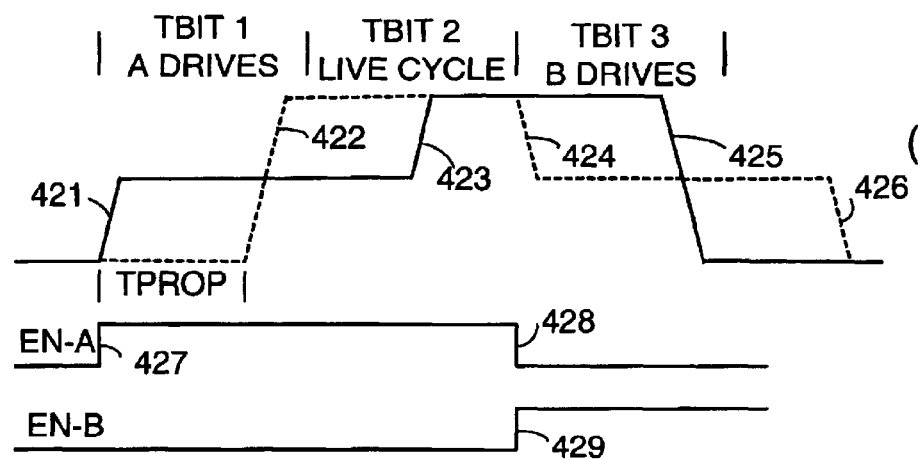
FIG. 4B is a voltage waveform showing voltage at a driver end of a transmission line and at a far end of the transmission line using a conventional live cycle protocol.
Figure 4C:
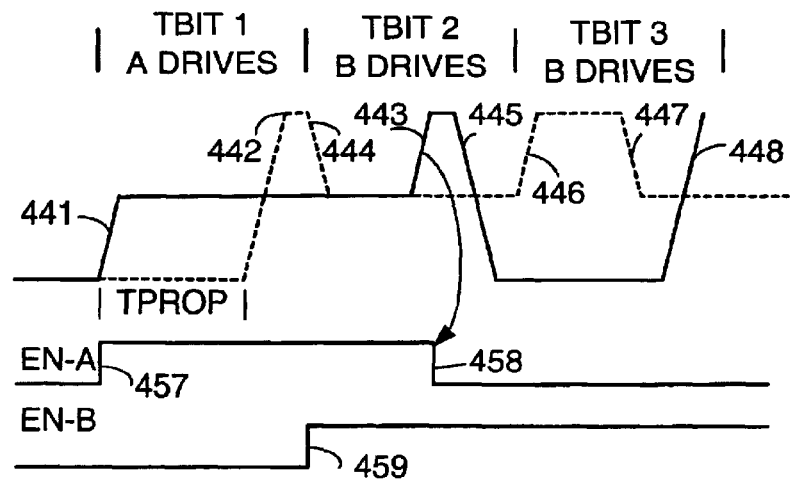
FIG. 4C is a voltage waveform showing voltage at a driver end of a transmission line and at a far end of the transmission line according to the present invention.
Figure 6B:
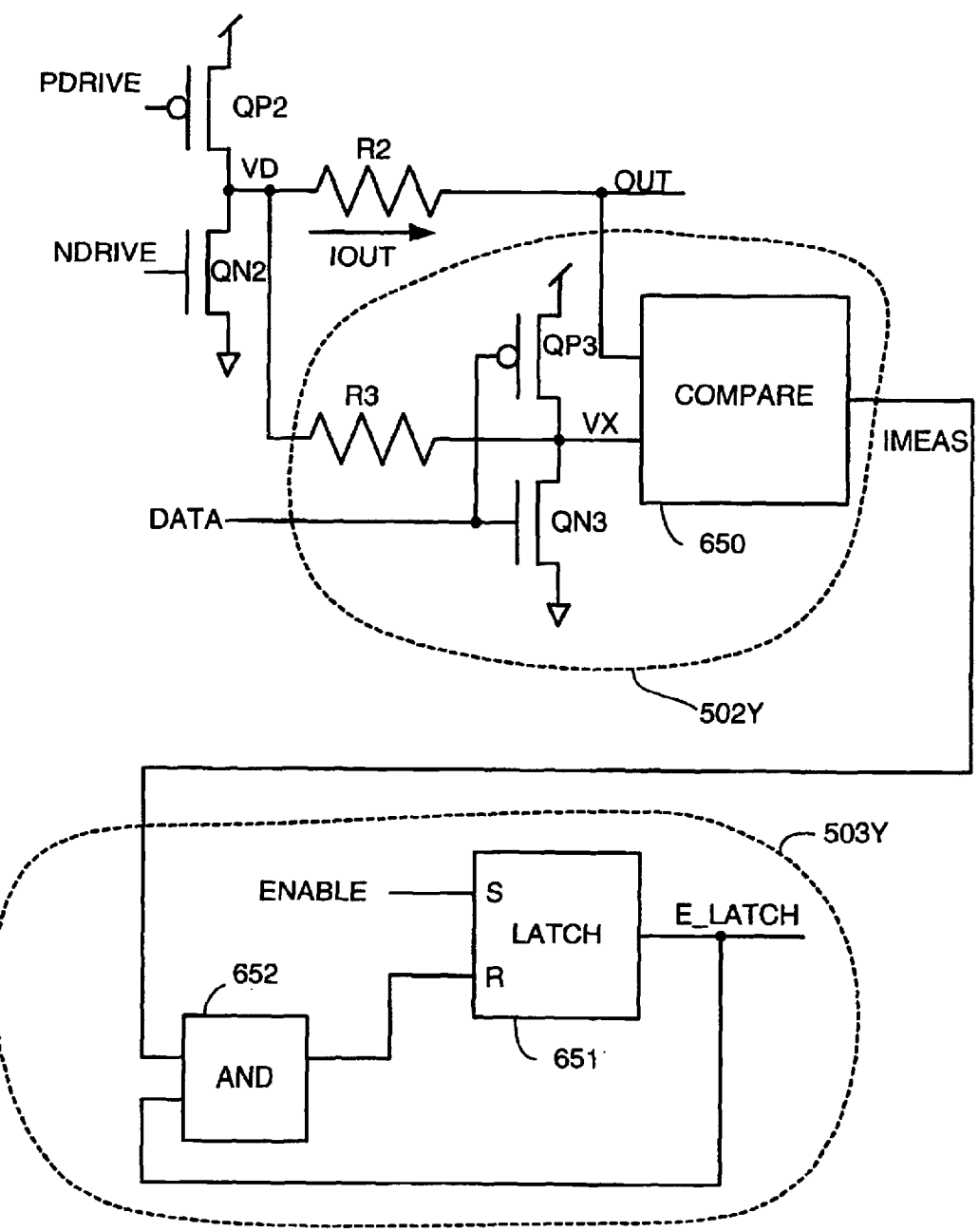

FIG. 6B shows a portion of driver 501, a sensor 502Y that is a current sensing embodiment of sensor 502, and enable logic 503Y that is an embodiment of enable logic 503 suitable for use with sensor 502Y. An output portion of a source terminated CMOS driver similar to the source terminated CMOS driver depicted in FIG. 2 is shown, comprising QP2, QN2, and resistor R2. "PDRIVE" and "NDRIVE" provide gate drive for QP2 and QN2 respectively and are created with logic blocks similar to NAND 201, inverter 203, and NOR 202 in driver 200. "IOUT" shows a current flowing through R2 in a direction the current would flow when QP2 is driving a "1". "IOUT" flows in the opposite direction when QN2 is driving a "0". When a "1" is being driven, and before the reflection has returned, a relatively large current flows through R2. For example, if Vdd=2.5 volts, the characteristic impedance of transmission line 520 is 50 ohms, and driver 501A is properly source terminated, IOUT will be (2.5 volts/100 ohms=0.025 amperes). 1.25 volts will be across the 50 ohms R2 (assuming for simplicity that QP2 and QN2 are ideal switches. In practice, QP2 and QN2 have impedances that are a significant fraction of the resistance of R2, however, for purposes of explanation here, QP2 and QN2 are assumed to be ideal switches. As explained earlier, the impedance of the active output FET, i.e., QP2 or QN2, added to the output resistor, i.e., R2, matches the characteristic impedance of the transmission line). That is, node VD will be 1.25 volts more positive than node OUT. As the reflection returns, node OUT rises, and the voltage difference between VD and OUT diminishes. When OUT is being driven high (to "1"), DATA is "1", turning on NFET QN3 and turning off QP3. R3 is a relatively high-valued resistor; QP3 and QN3 are relatively weak FETs compared to QP2 and QN2. QN3 conducts a small amount of current, which flows through R3, making the voltage at VX less than the voltage of VD. R3 and QN3 are designed such that, as IOUT decreases below a predetermined current, VX is at a lower voltage than the voltage at OUT (that is, drain-source current of QN3 times R3 is larger than IOUT times R2). Compare 650 is a voltage comparator that produces a logical "1" when a voltage at VX is lower than a voltage at OUT. When the driver drives a logical "0", QP3 drives a current through R3, causing node VX to be at a higher voltage than node VD. IOUT flows from OUT to VD when the driver drives a "0", so that OUT is at Vdd/2 until a reflection arrives, causing node OUT to become near GND, or zero volts. When the reflection arrives, voltage at node OUT becomes a lower voltage than node VX as IOUT reduces. Again, compare 650 responds with a "1" output when the voltage at node VX becomes larger than the voltage at OUT.

Logic 503Y is an embodiment of logic 503 that cooperates with sensor 502Y. Latch 651 is a set-dominant latch. "E_LATCH" is asserted whenever "ENABLE" is "1". E_LATCH in FIG. 6B is similar to signal E_LATCH in FIG. 6A, and is coupled to the "E" (enable) input of driver 501. AND gale 652 produces a "1" output if E_LATCH is "1" and compare 650 outputs a "1". The output of AND 652 is coupled to a reset, "R" input of latch 651, which will be reset, unless ENABLE is still asserted.

Figure 7A:
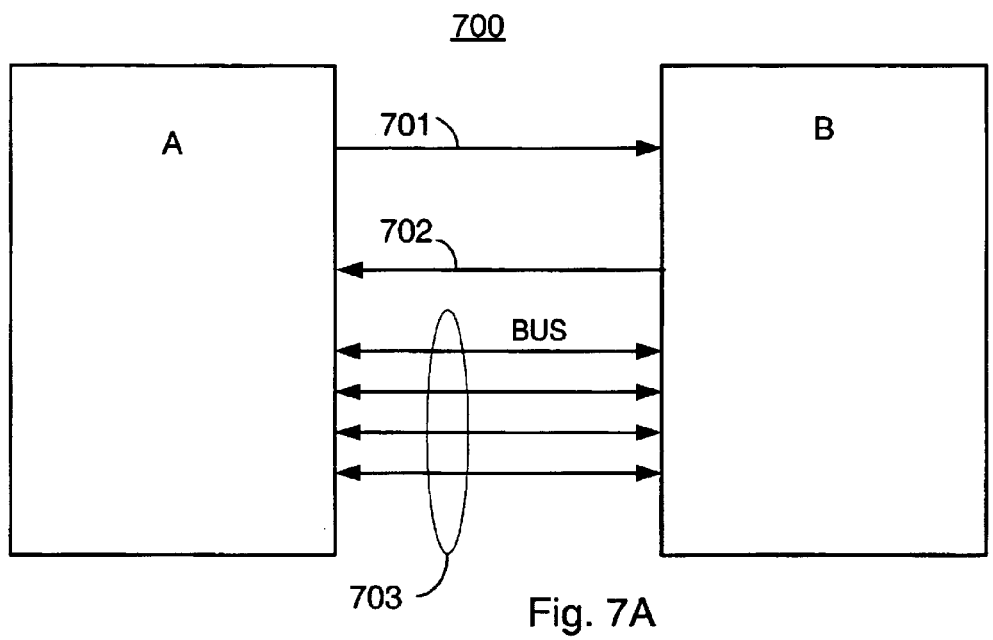
FIG. 7A–7B show a strobed signaling bus coupling two electronic units having drivers as described in the present invention, and a voltage waveform diagram describing signaling protocol on the strobed signaling bus.
Figure 7B:
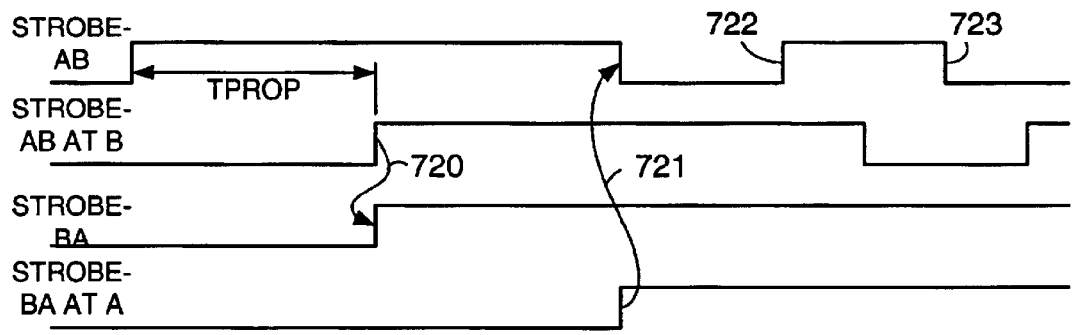

FIG. 7A shows an electronic system generally denoted as 700, comprising a first electronic unit A and a second electronic unit B, coupled by a signaling bus 703, a first signaling conductor 701, and a second signaling conductor 702. Signaling bus 703 is a group of signaling conductors. Bidirectional, source terminated driver/receivers such as the bidirectional driver/receiver shown in FIG. 5A are coupled to the signal conductors of bus 703 in electronic units A and B. When electronic unit A drives signals over signaling bus 703, a voltage transition is sent on first signaling conductor 701 at substantially the same time as the signals driven by electronic unit A on signaling bus 703. This voltage transition is called a strobe, and is used by electronic unit B to latch data transmitted on bus 703. Similarly, when electronic unit B drives signals over bus 703, a strobe is sent on second signaling conductor 702. FIG. 7B shows, schematically, voltage waveforms to illustrate how the driver of the present invention is used to allow a signaling bus to quickly "turn around" control of signaling bus 703. The STROBE-AB waveform in FIG. 7B is the voltage on first signaling conductor 701 as seen at electronic unit A. STROBE-AB rises, and, at substantially the same time, data is sent on signaling bus 703 by electronic unit A. If first signaling conductor 701 is driven by a source terminated driver, it is understood that the voltage at the driver of first signaling conductor 701 will not make a full transition until a reflection occurs, and the multiple voltage levels are omitted for simplicity. After a "TPROP" time interval determined by the length of first signaling conductor 701 and the propagation velocity of first signaling conductor 701 (signaling bus 703 is designed to have substantially the same length), STROBE-AB AT B rises; STROBE-AB AT B is the voltage on signal conductor 701 as seen at electronic unit B. Chip B uses the transition of STROBE-AB at B to latch in data from bus 703, and, at substantially the same time, (assuming electronic unit A has relinquished control of bus 703 and that electronic unit B is receiving control of bus 703) launches a transition on second signaling conductor 702, as seen in waveform STROBE-BA. This is highlighted by relationship 720. When the transition of the strobe sent by electronic unit B on second signaling conductor 702 reaches electronic unit A, as seen as STROBE-BA AT A, electronic unit A can (assuming electronic unit A will regain control of bus 703) at substantially the same time, launch its own strobe (see waveform STROBE-AB again at relationship 721) on first signaling conductor 701 and associated data on bus 703. In the example, electronic unit A is assumed to retain control of bus 703, and sends further transitions on first signaling conductor 701, and further sends associated data on bus 703 at substantially the same time as the further transitions on first signaling conductor 701. Using this arrangement, designers need not be concerned with TPROP times versus Tbit times as discussed earlier. That is, knowing that the driver on a distal end of the bus will automatically switch to a high impedance state upon receiving the reflection from its own signal (assuming proper protocol has de-asserted the ENABLE signal on the driver on the distal end), the driver on a proximal end of the bus can begin driving substantially immediately upon receipt of a strobe sent from the distal end.

Figure 8:
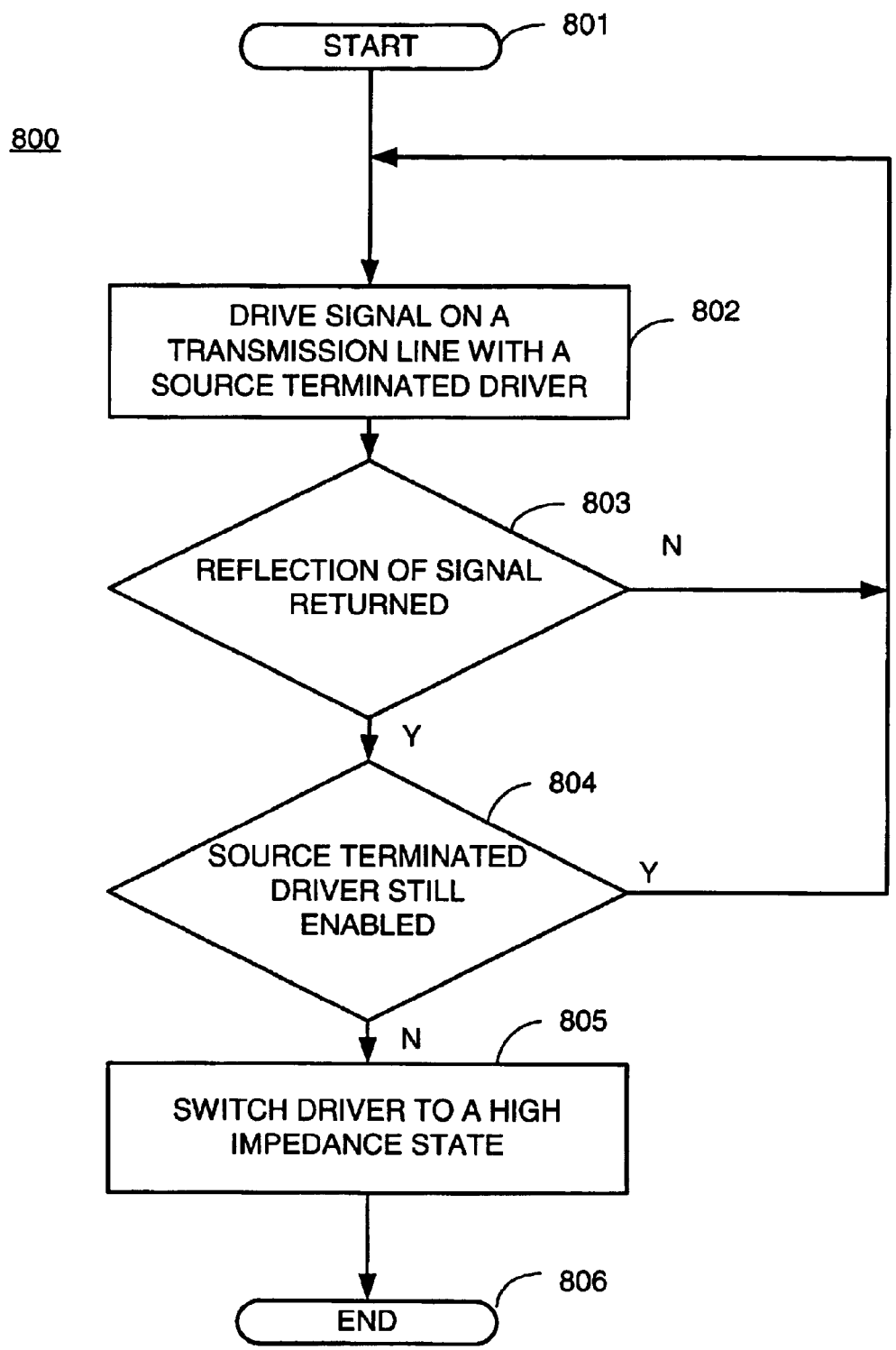
FIG. 8 shows a high level flow chart of a method for driving a signal onto a transmission line by source terminated driver and switching the source terminated driver into a high impedance state upon receipt of a reflection of the signal.

FIG. 8 shows a high level flow chart of a method of switching a source terminated driver that is coupled to a first end of a transmission line, a second end of the transmission line having a high impedance (i.e., at least an order of magnitude higher impedance than the characteristic impedance of the transmission line). The source terminated driver is switched into a high impedance state upon receipt of a reflection of a signal driven by the source terminated driver, when an enable signal is no longer active. Step 801 begins the method. In step 802, an enable signal coupled through enable logic to an input of the source terminated driver causes the driver to drive a signal according to a data input of the driver at a proximal end of the transmission line. The driver, when enabled, has an impedance closely matching a characteristic impedance of the transmission line. The signal propagates down the transmission line and encounters the high impedance of a distal end of the transmission line, whereupon a positive reflection propagates backward towards the proximal end of the transmission line. In step 803, a sensor detects arrival of the reflection. If the reflection has not yet arrived, the driver continues driving the signal, according to the data input of driver. If the reflection has arrived, step 804 checks if the enable signal is still active. If the enable signal is still active, the driver continues driving, according to the signal at the data input of the driver. If the enable signal is no longer active, step 805 switches the driver to a high impedance state and passes control to step 806 which ends the method.

While the foregoing is directed to embodiments of the present invention, other and further embodiments of the invention may be devised without departing from the basic scope thereof, and the scope thereof is determined by the claims that follow.

What is claimed is:

1. A method of switching a source terminated driver having a data input coupled to a data signal, an enable input coupled to an enable signal, and an output coupled to a proximal end of a transmission line into a high impedance state following transmission of a signal on the transmission line having a high impedance at a distal end of the transmission line comprising the steps of:

switching the enable signal to a first enable level to cause the driver to drive the data input as a transmission line signal at the proximal end of the transmission line;

switching the enable signal to a second enable level, suitable for switching the driver to the high impedance state, subsequent to the time the transmission line signal started;

detecting when the reflection of the transmission line signal returns to the proximal end of the transmission line; and switching the driver to a high impedance state, responsive to the detection, if the enable signal has been switched to the second enable level.

2. The method of claim 1, wherein the step of detecting comprises the steps of:

sensing a current driven by the driver; and asserting a disable signal when the current driven by the driver falls below a predetermined level.

3. The method of claim 2, wherein the step of sensing a current driven by the driver comprises the step of sensing a voltage across a resistive element through which current driven to the transmission line flows.

4. The method of claim 1, wherein the step of detecting comprises the steps of:

sensing a voltage at the proximal end of the transmission line;

asserting a first disable signal when a logic "1" is being driven and the voltage at the proximal end of the transmission line rises above a first reference voltage; and asserting a second disable signal when a logic "0" is being driven and the voltage at the proximal end of the transmission line falls below a second reference voltage.

5. The method of claim 4, wherein the step of sensing a voltage at the proximal end of the transmission line comprises the step of coupling the voltage at the proximal end of the transmission line to a logic gate designed to have a suitable input voltage threshold.

6. The method of claim 4, wherein the step of sensing a voltage at the proximal end of the transmission line comprises the step of coupling the voltage at the proximal end of the transmission line to a first input of a voltage comparator, a second input of the voltage comparator coupled to a reference voltage.

7. The method of claim 1, wherein the step of switching the driver to a high impedance state comprises the steps of:
   setting a set dominant latch by switching the enable signal to the first enable level;
   switching the enable signal to the second enable level; and
   using the detection of the reflection to assert a reset signal on a reset input of the set dominant latch.

8. A bidirectional driver/receiver comprising:
   a driver block capable of driving a transmission line, having a data input, an enable input, and a driver block output having an impedance similar to the characteristic impedance of the transmission line, the driver block further comprising:
   a source terminated driver having a driver data input coupled to the data input, a driver enable input, and an output coupled to the driver block output;
   a sensor capable of detecting when a reflection of a signal sent by the driver arrives at the driver; and
   an enable logic coupled to the sensor, to the enable input, and to the driver enable input, capable of switching the driver to a high impedance state;
   wherein the driver, subsequent to driving a signal on the transmission line, is switched by the enable logic to a high impedance state upon detection by the sensor that a reflection of the signal sent by the driver has arrived at the driver, if the enable input has been switched to a nonenabling logic level.

9. The bidirectional driver/receiver of claim 8, the sensor comprising:
   a logic block having an input voltage threshold suitable for detection of the arrival of the reflection.

10. The bidirectional driver/receiver of claim 8, the sensor comprising:
    a voltage reference, the voltage reference equal to a predetermined voltage level suitable to be interpreted as the returned reflected signal; and
    a comparator having a first input coupled to an output of the driver, and a second input coupled to the voltage reference, and an output coupled to the enable logic.

11. The bidirectional driver/receiver of claim 8, the enable logic comprising:
    a set-dominant latch having a set input coupled to the enable input, a reset input, and an output coupled to the driver enable input of the driver, and one or more logic blocks coupled to the sensor and the driver enable input suitable to assert a reset signal at the reset input when the signal at the driver enable input is asserted and the sensor has detected that the reflection of the signal sent by the driver has returned to the driver.

12. An electronic system comprising:
    a first electronic unit;
    a second electronic unit;
    a bidirectional signaling bus having a plurality of signaling conductors coupled to the first electronic unit and to the second electronic unit;
    a first plurality of bidirectional driver/receivers in the first electronic unit having a source terminated driver in each of the bidirectional driver/receivers, a bidirectional driver/receiver in the first plurality of bidirectional driver/receivers coupled to a signaling conductor in the bidirectional signaling bus;
    a second plurality of bidirectional driver/receivers in the second electronic unit having a source terminated driver in each of the bidirectional driver/receivers, a bidirectional driver/receiver in the second plurality of bidirectional drive/receivers coupled to a signaling conductor in the bidirectional signaling bus;
    a first strobe signaling conductor coupled to the first electronic unit and to the second electronic unit over which a first voltage transition is driven by the first electronic unit at substantially the same time at which the first electronic unit drives a first data onto the signaling bus; and
    a second strobe signaling conductor coupled to the first electronic unit and to the second electronic unit over which a second voltage transition is driven by the second electronic unit at substantially the same time at which the second electronic unit drives a second data onto the signaling bus;
    wherein the first electronic unit drives the first voltage transition on the first strobe signaling conductor and the first data on the signaling bus; the second electronic unit, in response to receipt of the first voltage transition, latches the first data, drives the second voltage transition on the second strobe signaling conductor and drives the second data onto the signaling bus.

13. The electronic system of claim 12 wherein each driver in the first plurality of bidirectional driver/receivers and each driver in the second plurality of bidirectional driver/receivers are capable of switching to a high impedance state upon receipt of a reflection of a signal driven by that driver.

14. The electronic system of claim 12, wherein each driver in the first plurality of bidirectional driver/receivers switches to a high impedance state upon receipt of a reflection of a signal driven by that driver only if the first electronic unit has relinquished control of the signaling bus.

* * * * *